United States Patent
Arima

(10) Patent No.: US 9,248,662 B2
(45) Date of Patent: Feb. 2, 2016

(54) COLOR ERASING APPARATUS DECIDING WHETHER OR NOT TO STORE READ IMAGE DATA, IMAGE STORAGE METHOD AND IMAGE STORAGE SYSTEM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yasuharu Arima, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 14/135,940

(22) Filed: Dec. 20, 2013

(65) Prior Publication Data

US 2015/0174912 A1 Jun. 25, 2015

(51) Int. Cl.
*G06K 15/00* (2006.01)
*B41J 2/32* (2006.01)
*H04N 1/00* (2006.01)

(52) U.S. Cl.
CPC ............. *B41J 2/32* (2013.01); *H04N 1/00244* (2013.01); *H04N 1/00766* (2013.01); *H04N 1/00769* (2013.01); *H04N 1/00782* (2013.01); *B41J 2202/37* (2013.01); *H04N 2201/0094* (2013.01); *H04N 2201/218* (2013.01)

(58) Field of Classification Search
CPC ... B41J 2/32; H04N 1/00782; H04N 1/00766; H04N 1/00769; H04N 1/00244
See application file for complete search history.

(56) References Cited

U.S. PATENT DOCUMENTS

| 8,538,280 | B2 | 9/2013 | Yahata et al. | |
| 2008/0259388 | A1* | 10/2008 | Sawaguchi | 358/1.15 |
| 2008/0316516 | A1* | 12/2008 | Kajikawa | 358/1.13 |

FOREIGN PATENT DOCUMENTS

JP 2002-245075 8/2002

* cited by examiner

*Primary Examiner* — Benny Q Tieu
*Assistant Examiner* — Sunil Chacko
(74) *Attorney, Agent, or Firm* — Amin, Turocy & Watson, LLP

(57) ABSTRACT

In accordance with one embodiment, a color erasing apparatus comprises a reading section, a storage section and a control section. The reading section reads an image formed on a sheet to acquire image data. The storage section stores the image data acquired by the reading section. The control section determines whether or not there exists a mark in the image data, and carries out a control to, in a case in which there exists a mark in the image data, delete the image data read by the reading section from the storage section if it is determined that there exists a mark and the image data acquired by the reading section coincides with the image data stored through the processing of an image forming apparatus when determining whether or not the image data read by the reading section coincides with the image data stored in the storage section in advance, or store the image data read by the reading section in the storage section if it is determined that the image data doesn't coincide with each other.

8 Claims, 9 Drawing Sheets

→ FIRST CONVEYANCE PATH 318

----▶ SECOND CONVEYANCE PATH 320

—·—▶ THIRD CONVEYANCE PATH 322

COLOR ERASING APPARATUS DECIDING WHETHER OR NOT TO STORE READ IMAGE DATA, IMAGE STORAGE METHOD AND IMAGE STORAGE SYSTEM

FIELD

Embodiments described herein relate to an erasing apparatus.

BACKGROUND

Conventionally, before erasing a color-erasable toner image formed on a sheet, an erasing apparatus scans the sheet to store the image information formed on the sheet.

Further, in an image forming apparatus, an image formed on a sheet is converted to an electronic data image and stored during a copy or FAX process.

However, if stored in an image forming apparatus and thereby stored in an erasing apparatus, the same image information is stored repeatedly.

DETAILED DESCRIPTION

In accordance with embodiments described herein, a color erasing apparatus comprises a reading section, a storage section and a control section. The reading section reads an image formed on a sheet and acquires image data. The storage section stores the image data acquired by the reading section. The control section determines whether or not there exists a mark in the image data, and carries out a control to, in a case in which there exists a mark in the image data, delete the image data read by the reading section from the storage section if it is determined that there exists a mark and the image data acquired by the reading section coincides with the image data stored through the processing of an image forming apparatus when determining whether or not the image data read by the reading section coincides with the image data stored in the storage section in advance, or store the image data read by the reading section in the storage section if it is determined that the image data doesn't coincide with each other.

An embodiment is described in which whether or not an image file is generated in a color erasing apparatus and the image file, if generated, is not stored. When an image file is generated, the image drawn on a sheet serving as an object to be color-erased is not stored.

Further, on the other hand, the color erasing apparatus of the embodiment stores the data drawn on a processing object sheet when a correction is carried out on the sheet by a user. In this way, when permanently stored data is changed with handwritten correction, the changed image can be stored.

Figure 1:
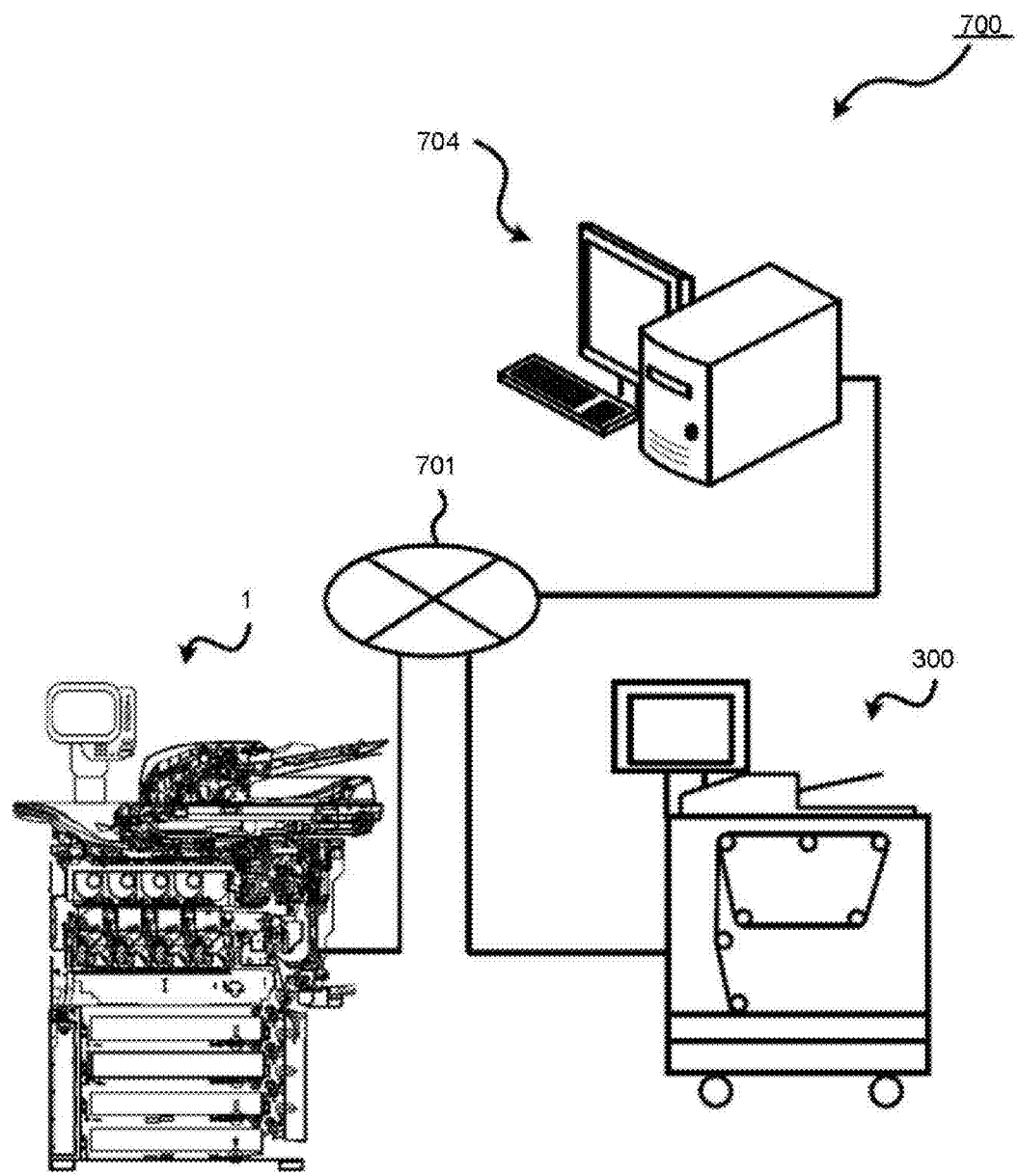
FIG. 1 is a schematic diagram illustrating the configuration of the system of an embodiment.

FIG. 1 is a diagram illustrating an example of the configuration of the system of the embodiment. An image storage system 700 comprises an image forming apparatus 1, a color erasing apparatus 300 and a server 704, which are connected with each other through a network 701.

Figure 2:
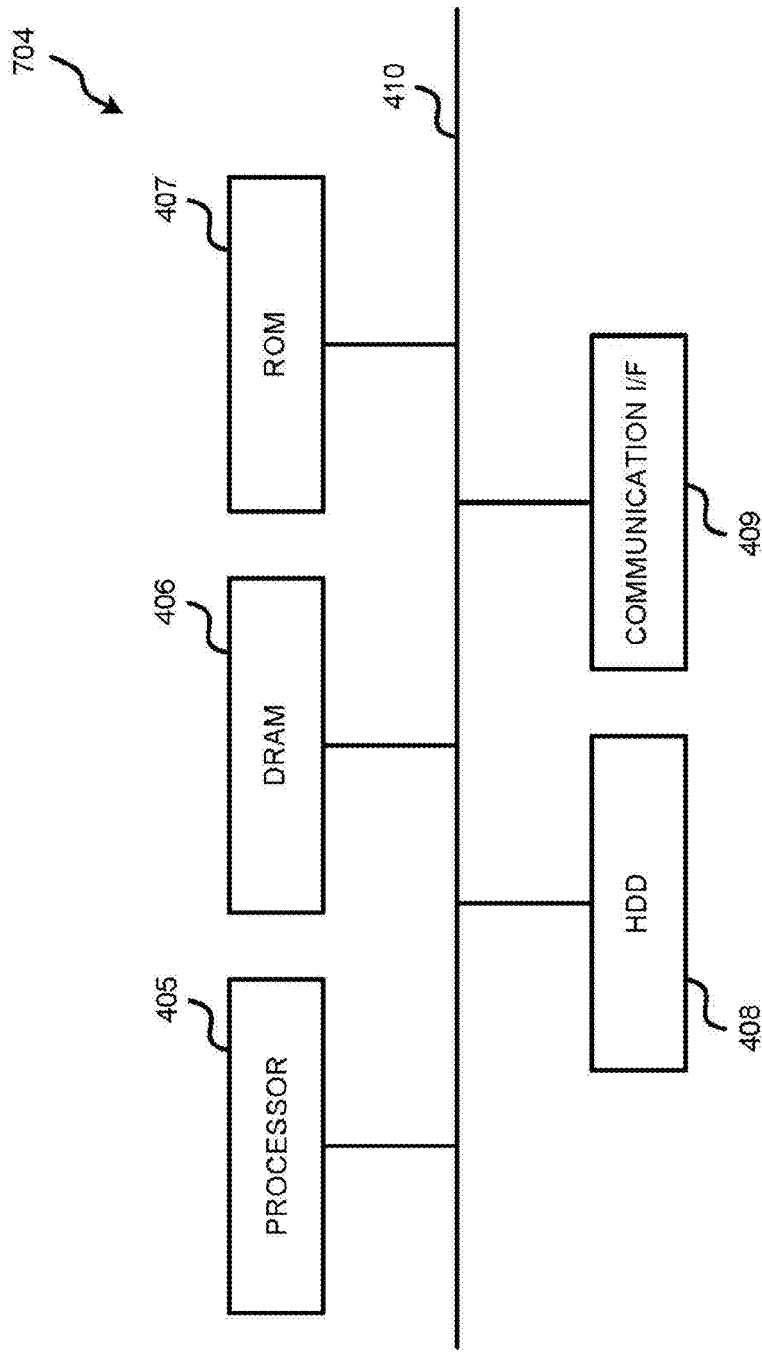
FIG. 2 is a diagram illustrating an example of the hardware configuration of a server.

FIG. 2 is a block diagram illustrating an example of the hardware configuration of the server 704. The server 704 comprises a processor 405, a DRAM (Dynamic Random Access Memory) 406, a ROM (Read Only Memory) 407, an HDD (Hard disk drive) 408 and a communication I/F (Interface) 409.

The processor 405 is an arithmetic processing apparatus such as a CPU (Central Processing Unit). The processor 405 is a central arithmetic processing apparatus which controls each piece of hardware using the data or programs stored in the DRAM 406. The DRAM 406 is a primary storage apparatus which stores data in a volatile manner, and the ROM 407 is an apparatus which stores a piece of system software at a time of start in a non-volatile manner. The HDD 408 is a hard disk drive for storing user data and software in a non-volatile manner. In the embodiment, the HDD 408 stores the image obtained during a copy or FAX receiving process or an image the color of which is not erased. The communication I/F 409 is a network card for controlling a communication and is connected with the network 701.

Figure 3:
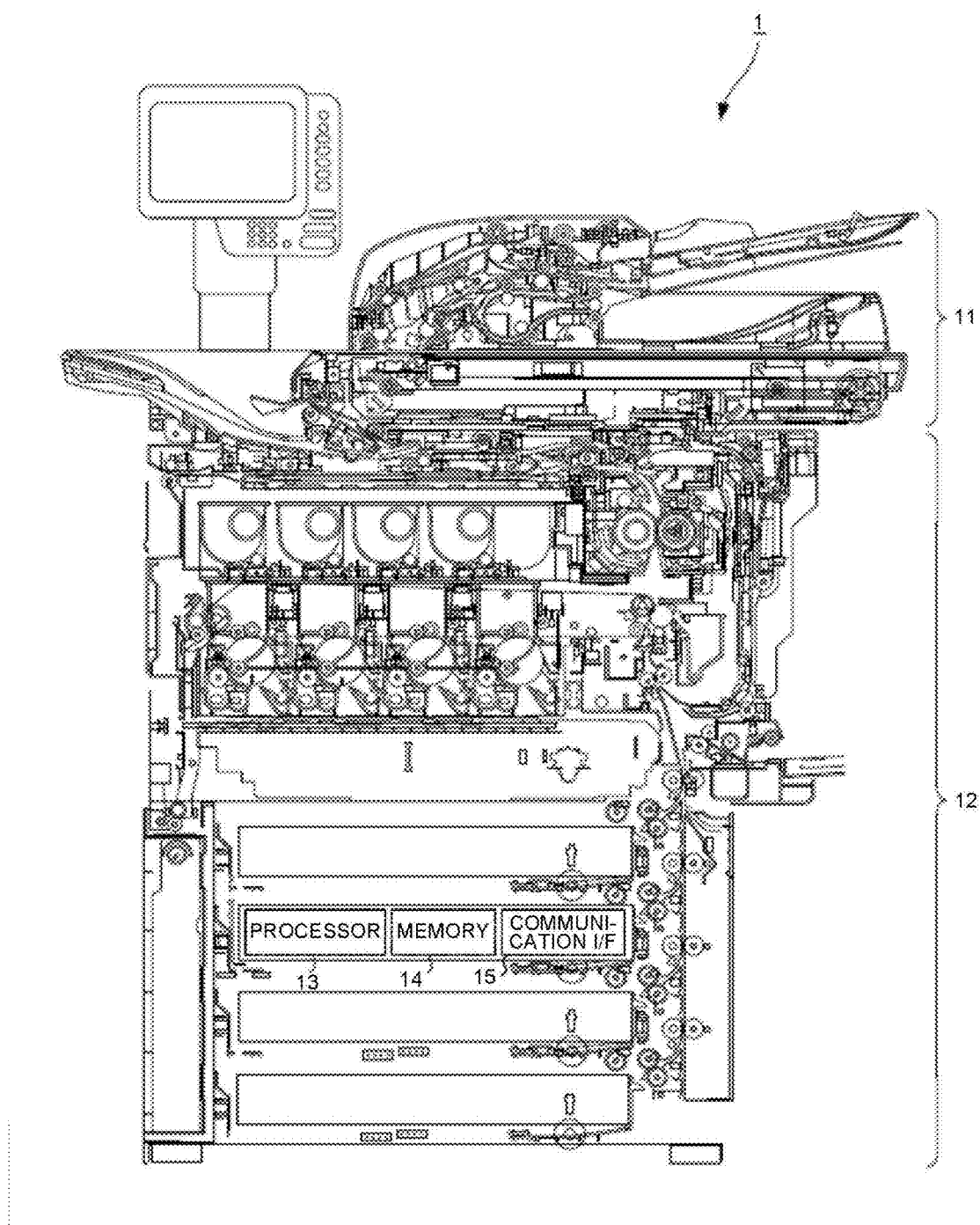
FIG. 3 is a schematic diagram illustrating an image forming apparatus according to the embodiment.

FIG. 3 is a schematic diagram illustrating an image forming apparatus 1 according to the embodiment.

The image forming apparatus 1 comprises a reading section 11 and an image forming section 12. The reading section 11 has a function of scanning and reading an image of a sheet original and an image of a book original. The image forming section 12 has a function of forming a developer image on a sheet based on the image read by the reading section 11 from an original or the image data sent to the image forming apparatus 1 from an external device. Further, the image forming apparatus 1 has a mark printing section 109 which prints, according to the selection of the user, a mark on a sheet on which image data is stored.

Further, the image forming apparatus 1 comprises a processor 13, a memory 14 and a communication I/F 15. The processor 13 has a function of carrying out various processing in the image forming apparatus 1 and achieves various functions by loading and executing the programs pre-stored in the memory 14.

The memory 14 is a storage section consisting of nonvolatile storage apparatus including a RAM serving as a primary storage apparatus or a flash memory and a hard disk drive and the like. The communication I/F 15, which is a unit for controlling the data transmission/reception with the external device, is connected with the network 701.

Figure 4:
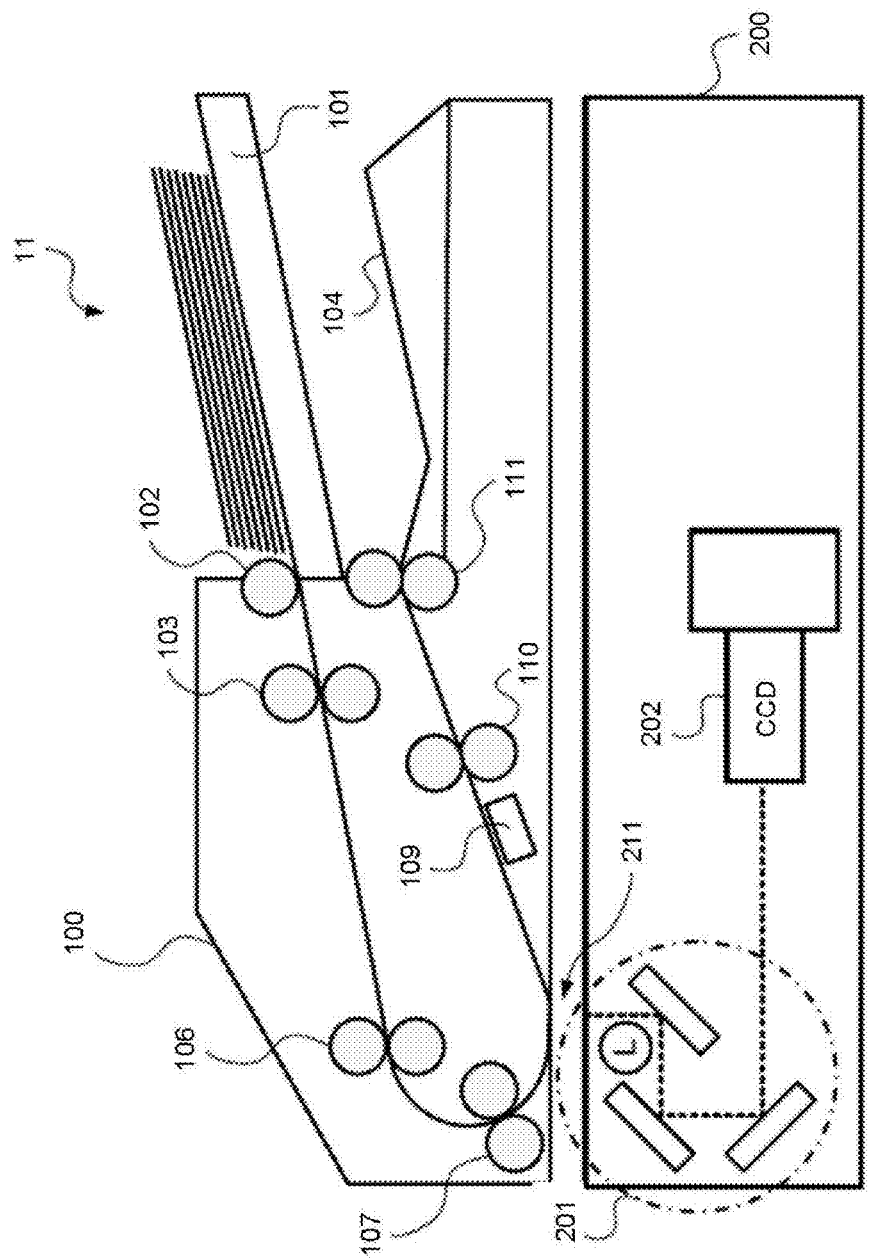
FIG. 4 is a schematic diagram illustrating the image information reading section of the image forming apparatus shown in FIG. 2.

FIG. 4 is a schematic diagram illustrating the reading section 11. The reading section 11 comprises an automatic document feeder 100 and an image reading apparatus 200.

In the automatic document feeder 100, a sheet stacked on a tray 101 is conveyed to a sheet conveyance path by a paper feed roller 102 and then conveyed to a register roller 106 by a conveyance roller 103. Then, the sheet conveyed to the register roller 106 is conveyed to a reading roller 107 by the register roller 106 and then scanned by the image reading apparatus 200 at a reading position 211. After passing the reading position 211, the sheet is printed with a mark 900 which will be described later by the mark printing section 109. Here, the mark printing section 109 prints a mark 900 which will be described later on a sheet on which image data is stored and prints no mark 900 on a sheet on which no image data are stored. The sheet printed with the mark 900 is conveyed to a sheet discharging roller 111 by the reading roller 110 and then discharged to a tray 104.

The structure which scans a sheet at the reading position 211 is described below. In the automatic document feeder 100, the surface of a sheet passing the reading position 211 is irradiated by an exposure lamp L. The light reflected from the surface of the sheet based on irradiated light is reflected by a mirror group 201 and guided to a CCD sensor 202 which receives the light reflected. The CCD sensor 202, according to a photoelectric conversion, converts a light reception signal to data which is then stored in the memory 14.

The image data stored in the memory 14 is then stored in the HDD 408 of the server 704 through the network 701.

Figure 5:
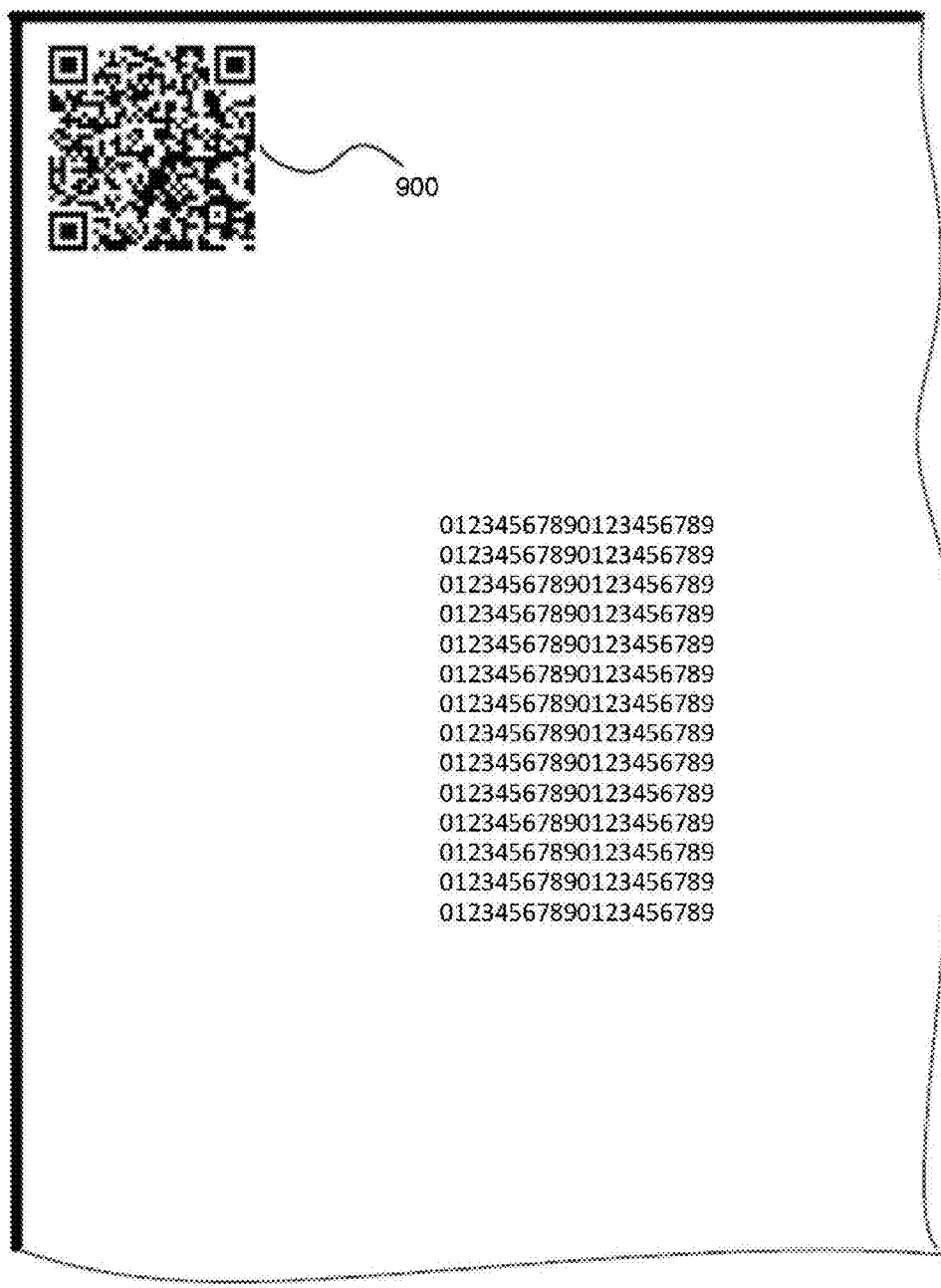
FIG. 5 is a diagram illustrating a sheet printed with a mark.

Next, a structure which prints a mark 900 (FIG. 5) on a sheet using the mark printing section 109 is described. FIG. 5 shows an example of a sheet on which a mark is formed. The mark printing section 109 forms a mark with a color-erasable toner and prints different marks 900 on the sheets conveyed thereto. The mark 900, which is, for example, a two-dimensional code or another machine-readable code, can be associated and changed with a mark printing time to recognize each conveyed sheet. Further, as shown in FIG. 5, the mark 900 is printed at a blank position on the edge of a sheet.

Figure 6:
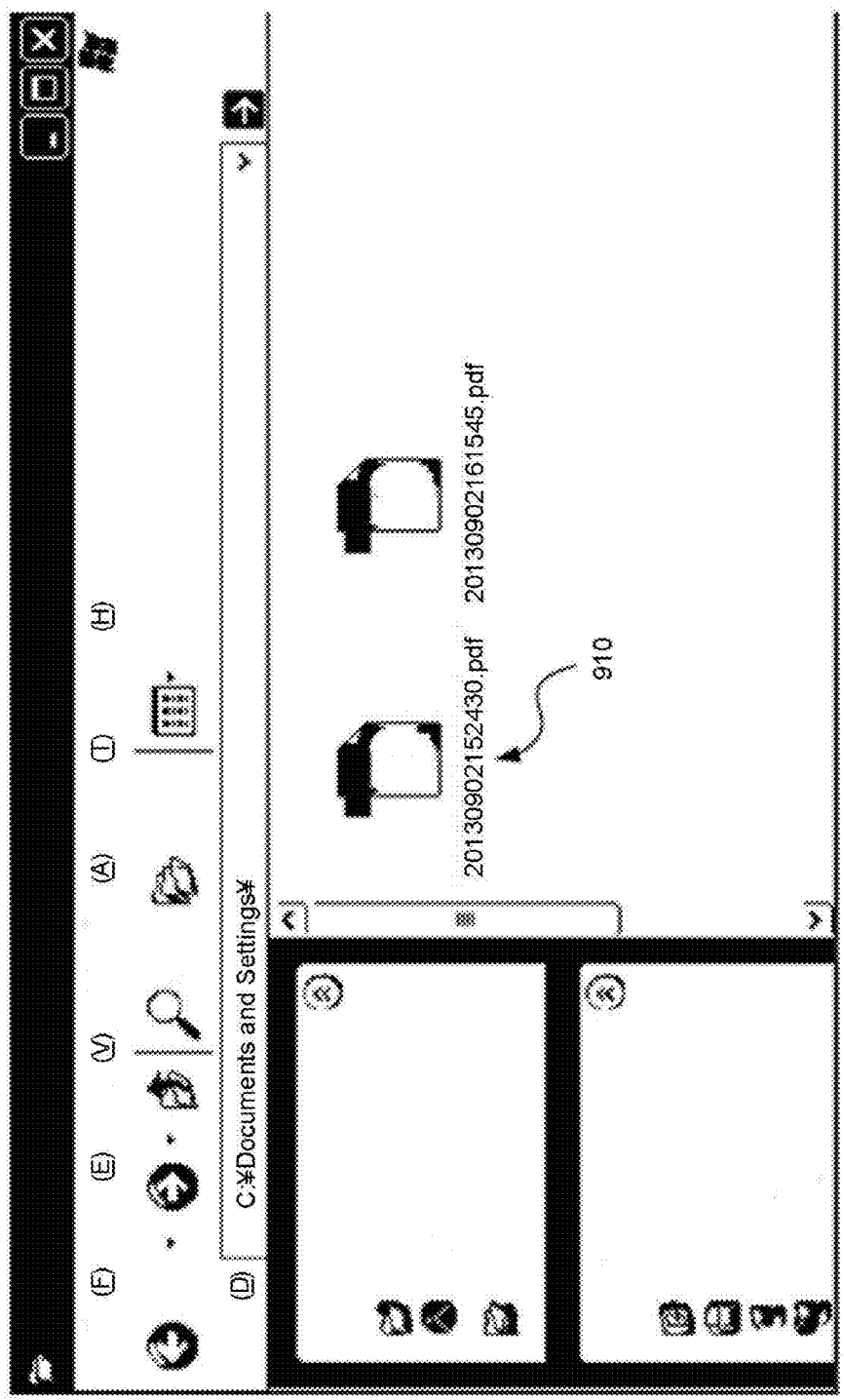
FIG. 6 is a diagram illustrating the file name of the image data read by an image forming apparatus.

The file name of the image data stored in the memory 14 is described below. The file name of the image data stored in the memory 14 is named in association with the time an image is read. FIG. 6 is a diagram illustrating file names in association with the time an image is read. For example, the file name '20130902152430.PDF' of the file 910 shown in FIG. 6 represents the file name of the image data of a sheet scanned at 15:24:30 on Sep. 2, 2013. The mark 900 is printed on a sheet in such a state that the printed mark 900 contains the information related to an image, the information of the file name involved in the example.

Here, in the image forming apparatus 1, in addition to a sheet conveyed in the automatic document feeder 100, the image reading apparatus 200 further scans a sheet on which an image is formed by the image forming section 12. Further, in a copy or FAX receiving process, the image forming section 12 prints the aforementioned mark on a discharged sheet. When the mark is a machine-readable code such as a two-dimensional code, the image forming section 12 makes a file name contained in the two-dimensional code in the way described above when storing an image file permanently according to the designation of the user. Further, when an image file is stored permanently, a mark is formed on the surface of the image file on which an image is formed.

Figure 7:
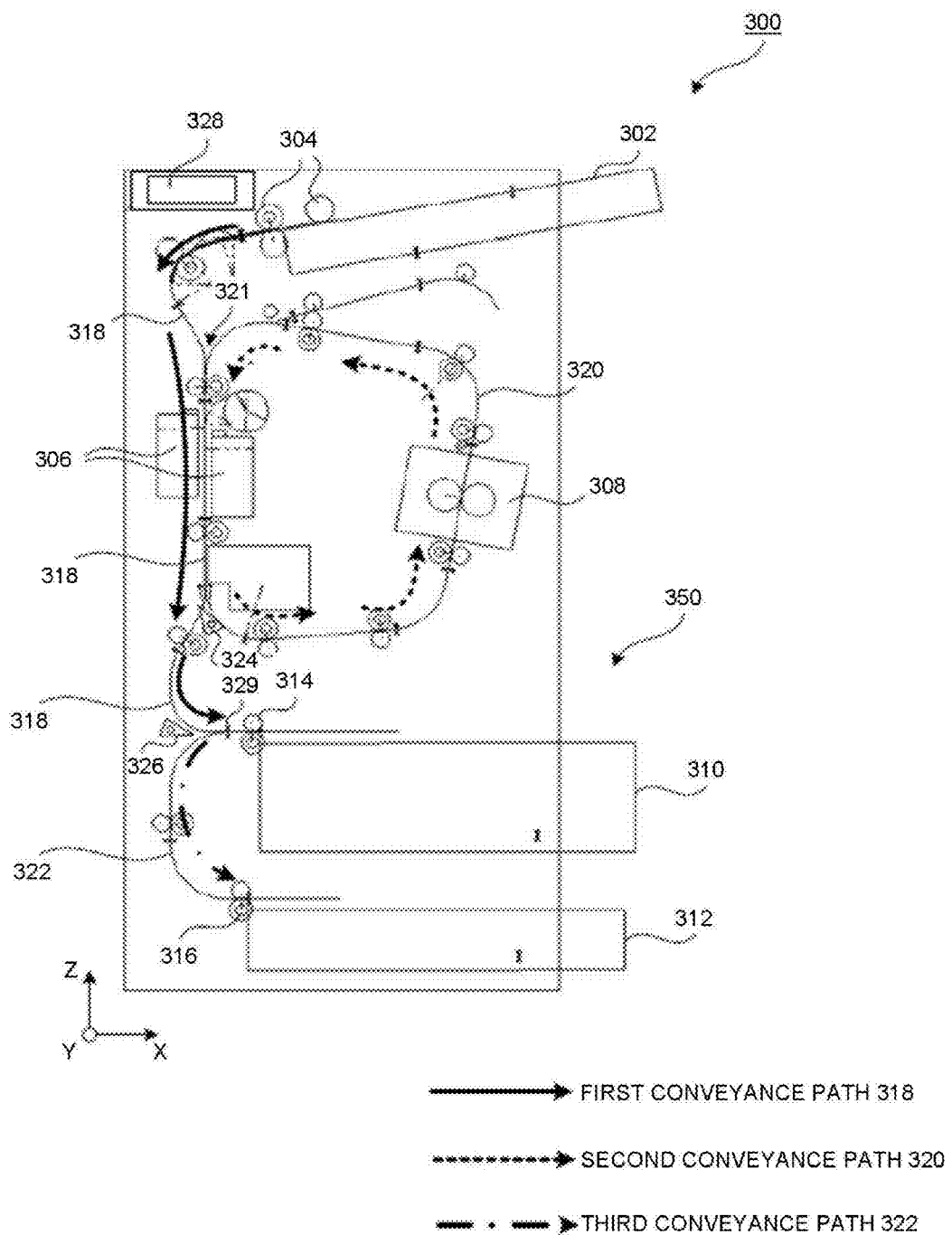
FIG. 7 is a schematic diagram illustrating an erasing apparatus.

FIG. 7 is a schematic diagram illustrating the configuration of a color erasing apparatus 300.

The color erasing apparatus 300 comprises a paper feed tray 302, a paper feed member 304, reading sections 306, a color erasing section 308, a discharging section 350, a first conveyance path 318, a second conveyance path 320, a third conveyance path 322 and a first branching component 324. The discharging section 350 comprises a first tray 310, a second tray 312, discharging rollers 314 and 316 and a second branching component 326.

The processing object sheet stacked on the paper feed tray 302, which is a sheet on which an image is formed with a color-erasable toner, is conveyed to the first conveyance path by the paper feed member 304 and then passes through the reading section 306. Here, the color erasable toner refers to a tone which can be heated to a specific temperature (higher than the fixing temperature of the image forming apparatus 1) to be color-erased.

Two reading sections 306 are arranged across the first conveyance path 318 to read the image data formed on two sides of the sheet passing through the reading section 306. The storage method of the image data read by the reading section 306 will be described later in detail.

The processing object sheet passing through the reading section 306 is guided to the second conveyance path 320 or the first tray 310 by the first branching component 324. When an image is formed on the processing object sheet, the first branching component 324 conveys the sheet to the second conveyance path 320. On the other hand, when no image is formed on the sheet, the first branching component 324 conveys the sheet to the first tray 310.

The sheet conveyed to the second conveyance path 320, after being heated to perform a color erasing processing by the color erasing section 308, merges with the first conveyance path 318 at a mergence point 321. Then, the sheet is scanned again in the reading section 306.

After the image formed on the sheet which passes through the reading section 306 again is erased, the sheet is conveyed to the second tray by the second branching component 326. On the other hand, if the image formed on the sheet is not erased, the sheet is guided to the third conveyance path 322 by the second branching component 326 and then conveyed to the tray 310.

Figure 8:
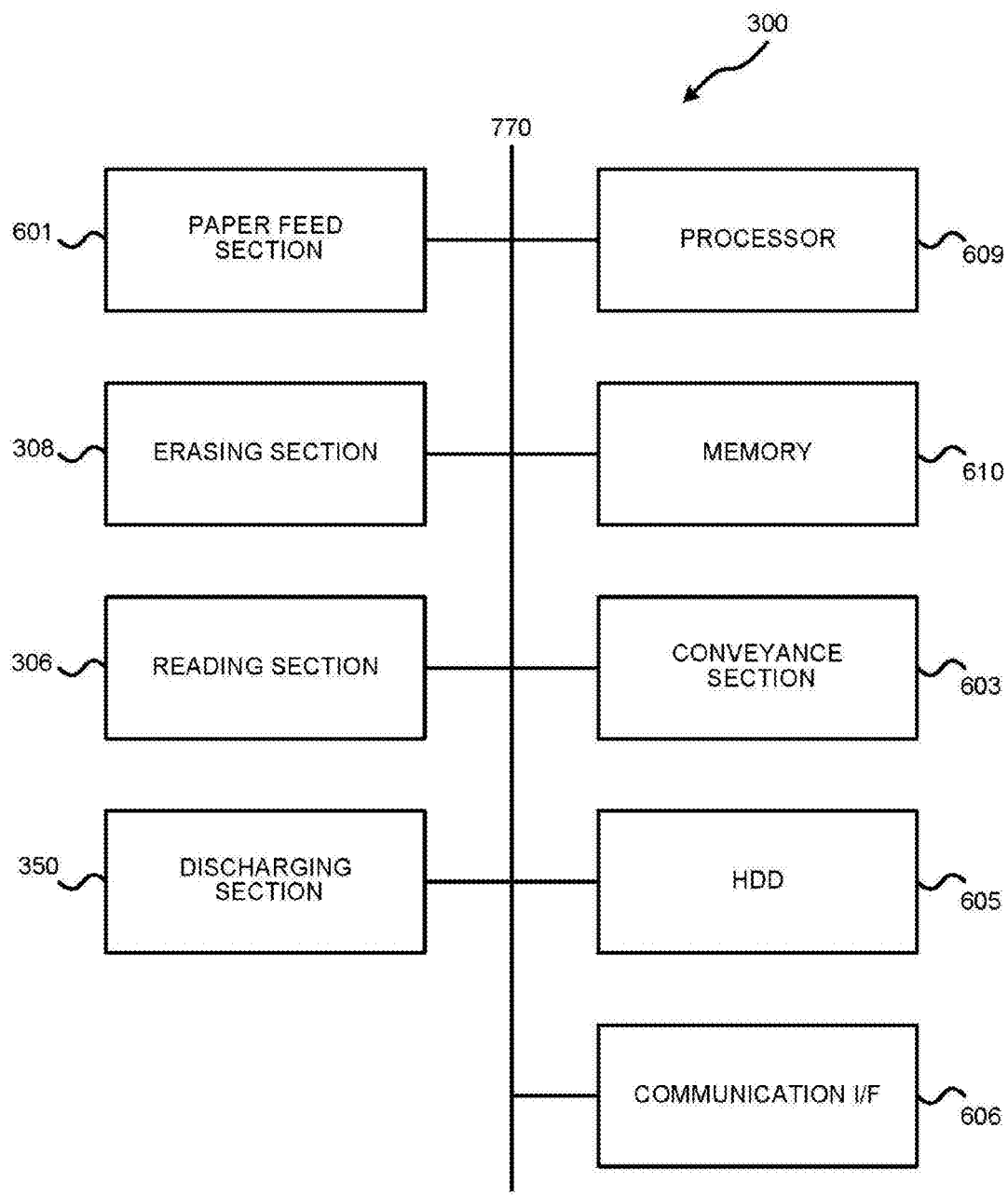
FIG. 8 is a diagram illustrating an example of the hardware configuration of an erasing apparatus.

FIG. 8 is a block diagram illustrating the hardware configuration of the color erasing apparatus 300. In the color erasing apparatus 300, a processor 609, a paper feed section 601, the erasing section 308, a memory 610, the reading section 306, a conveyance section 603, a storage section 605, a communication I/F 606 and the discharging section 350 are connected with each other through a communication bus 770. The paper feed section 601 comprises the paper feed tray 302, a detection sensor 303 and a paper feed component 304, and the conveyance section 603 comprises the first conveyance path 318, the second conveyance path 320 and the third conveyance path 322.

Further, the color erasing apparatus 300 is connected with the network 701 through the communication I/F 606.

Figure 9:
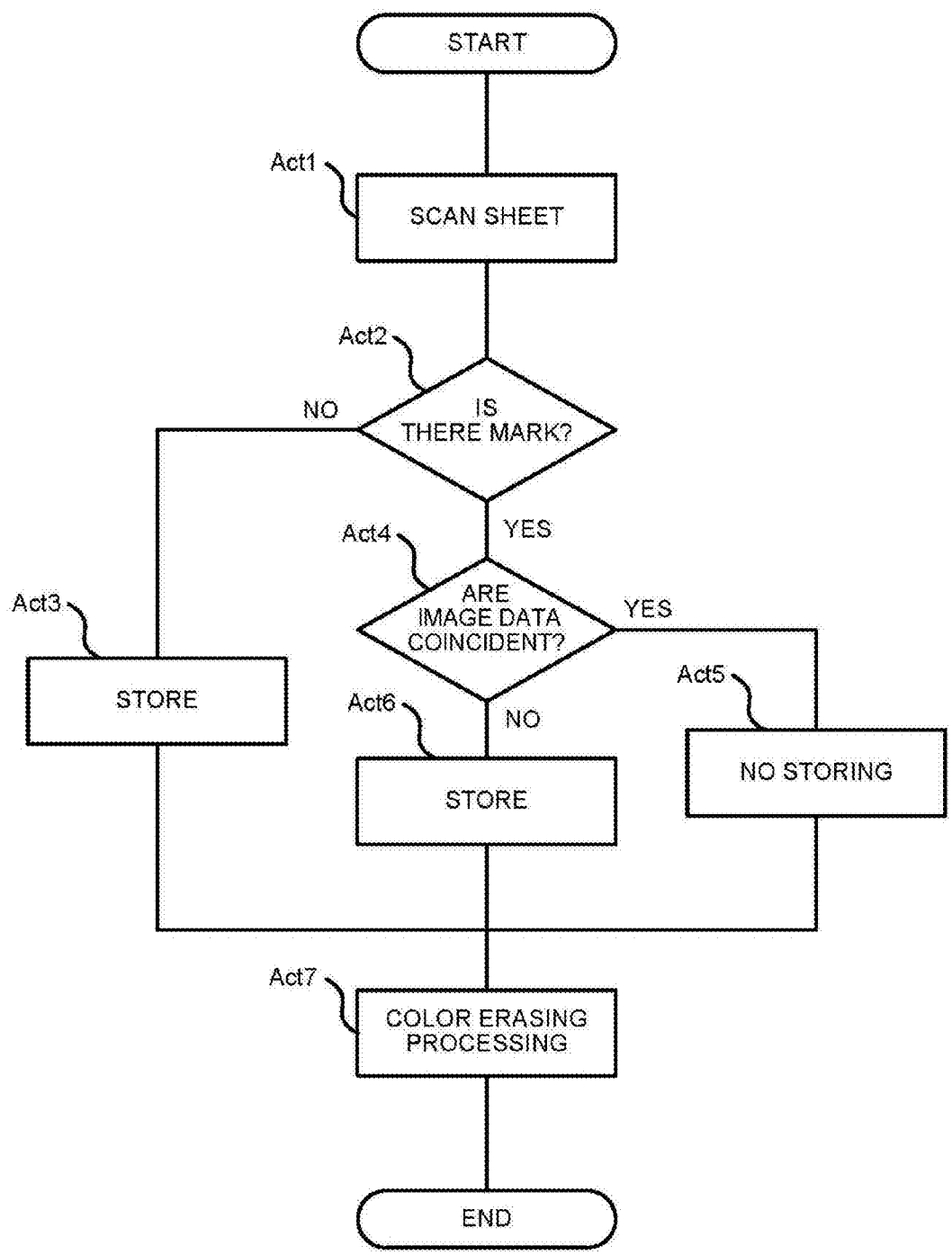
FIG. 9 is a flowchart illustrating the operations of an erasing apparatus.

FIG. 9 is a flowchart illustrating a method for storing the image data in the color erasing apparatus 300.

In the color erasing apparatus 300, when a color erasing processing is started, a sheet stacked on a paper feed tray 302 is conveyed to the reading section 306 by the paper feed component 304.

In Act 1, the reading sections 306 are controlled by the processor 609 to read the image information formed on the sheet. Then, the processor 609 stores the image data of an image formed on the sheet in the memory 610.

In Act 2, if the processor 609 determines, according to the image data stored in the memory 610, no mark 900 is printed on the sheet (NO in Act 2), the flow proceeds to Act 3. On the other hand, if the processor 609 determines that a mark is printed on the sheet in Act 2 (YES in Act 2), the flow proceeds to Act 4.

In Act 3, the processor 609 stores the image data stored in the memory 610 and read by the reading section 306 in the HDD 408 of the server 704 through the network 701. In other words, when no mark is printed on the sheet read by the reading section 306, the processor 609 carries out a control to store the image data permanently in the HDD 408 through the network 701.

In Act 4, if the processor 609 determines the image data read in the color erasing apparatus 300 coincides with that read in the image forming apparatus 1 (YES in Act 3), and the flow proceeds to Act 5. On the other hand, the flow proceeds to Act 6 if the processor 609 determines that the image data read in the color erasing apparatus 300 doesn't coincide with the image data read in the image forming apparatus 1 (NO in Act 3). Further, the aforementioned 'coincidence', which does not necessarily mean identical, further includes the case in which it is determined that the similarity of the two image data is higher than a threshold value determined in the processor 609 in advance.

A method for comparing the image data read in the color erasing apparatus 300 with that read in the image forming apparatus 1 is described below in detail.

In this example, the mark 900 is a two-dimensional code. Further, as stated above, each sheet read by the reading section 11 of the image forming apparatus 1 is printed with a different mark. Then, the printed two-dimensional code contains a file name. The processor 609 extracts the mark printed on the sheet read in the color erasing apparatus 300 to recognize the sheet. Next, the processor 609 calls the image data read in the image forming apparatus 1 for the image data of the sheet recognized. As a file name is contained in the two-dimensional code, the processor 609 calls, based on the file name, image data from the image data read in the image forming apparatus 1. Sequentially, the processor 609 determines whether or not the image data read using the image forming apparatus 1 coincides with that read using the reading section 306 of the color erasing apparatus 300. The determination of whether or not the image data coincides with each other is based on the result of an image processing such as an edge detection processing.

Through the processing in Act 4, for example, if a handwritten sentence is added on the sheet read using the image forming apparatus 1, the image data read using the image forming apparatus 1 is overwritten to be the image data read using the color erasing apparatus, thus preventing the repeated storage for the image data of the same sheet.

Further, in Act 6, for the same sheet, the image data read in the image forming apparatus 1 is overwritten by that read in the color erasing apparatus 300, however, the present invention is not limited to this case, it may be an implementation of storing, but not overwriting, the image data.

In Act 5, the processor 609 erases the image data read in the reading section 306 and temporarily stored in the memory 610. In other words, the data read using the color erasing apparatus 300 is deleted from the memory 610 when the image data read using the color erasing apparatus 300 coincides with that read using the image forming apparatus 1. In this way, the repeated storage of the same image data in the image forming apparatus 1 and the color erasing apparatus 300 is prevented.

In Act 6, for the image data formed on the same sheet, the processor 609 overwrites the image data read using the image forming apparatus 1 to be that read using the color erasing apparatus 300.

In Act 7, the processor 609 executes, in the color erasing apparatus 300, a color erasing processing, the detail of which are the same as those described above.

Further, the image data read using the image forming apparatus 1 and the image data read using the color erasing apparatus 300 are stored in the HDD 408 of the server 704 in the embodiment, however, the storage destination of the image data is not limited to this case, the image data may further be stored in the memory 14 of the image forming apparatus 1 or the HDD 605 or the memory 610 of the color erasing apparatus 300.

Further, the 'color erasing processing (erasing processing)', which described as the erasing of the color of an image in the description of the embodiments above, further includes the erasing of an image. That is, the erasing apparatus described herein is not limited to an apparatus for erasing the color of an image by heated. For example, the erasing apparatus may be an apparatus for erasing the color of an image on a sheet through light irradiation or an apparatus for erasing the image formed on a special sheet. Further, the erasing apparatus may also be an apparatus for removing (erasing) an image formed on a sheet. The erasing apparatus may be any structure that is capable of removing the image on a sheet to make the sheet reusable.

As stated above in detail, according to the technology disclosed herein, a technology is provided which is capable of preventing, for the image data of the same sheet, the repeated storage of the image data read using an image forming apparatus and the image data read using a color erasing apparatus to relieve the increase in storage data quantity.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A color erasing apparatus comprises:
   a reading section configured to read an image formed on a sheet to acquire image data;
   a storage section configured to store the image data acquired by the reading section;
   a control section configured to determine whether or not there exists a mark in the image data, and carry out a control to, in a case in which there exists a mark in the image data, delete the image data read by the reading section from the storage section if it is determined that there exists a mark and the image data acquired by the reading section coincides with an image data stored through the processing of an image forming apparatus when determining whether or not the image data read by the reading section coincides with the image data stored in the storage section in advance, or store the image data read by the reading section in the storage section if it is determined that the image data does not coincide with each other; and
   a color erasing section configured to erase the color of the image formed on the sheet, wherein
   the mark is a mark representing the storage of the data of the image formed on the sheet through the processing of an image forming apparatus
   the mark is an image formed on the sheet by the image forming apparatus as the code containing the file name of the image data; and
   the control section extracts the machine-readable code in the image data acquired by the reading section, acquires the image data stored by the image forming apparatus based on a file name contained in the code, and carries out the aforementioned comparison.

2. The color erasing apparatus according to claim 1, wherein
   the control section determines whether or not there exists a mark in the image data, and carries out a control to store the image data read by the reading section in the storage section if it is determined that there exists a mark in the image data.

3. The color erasing apparatus according to claim 2, wherein
the image data stored in the storage section in advance is image data stored through the processing of an image forming apparatus.

4. The color erasing apparatus according to claim 1, wherein the mark is a machine-readable code containing the data relating to the image data.

5. The color erasing apparatus according to claim 4, further comprising:
a communication section configured to control the communication with a server; and
the control section acquires, from the server, the image data stored through the processing of the image forming apparatus through the communication section based on a file name and controls the communication section, when the result of the comparison is not coincident, to send the image data stored in the storage section to the server.

6. An image storage system, comprising:
a server configured to store image data permanently;
an image forming apparatus configured to form a mark on a sheet when an image formed on the sheet is stored in the server;
a reading section configured to read an image formed on the sheet to acquire image data;
a storage section configured to store the image data acquired by the reading section;
a control section configured to determine whether or not there exists a mark in the image data, and carry out a control to, in a case in which there exists a mark in the image data, delete the image data read by the reading section from the storage section if it is determined that there exists a mark and the image data acquired by the reading section coincides with the image data stored through the processing of the image forming apparatus when determining whether or not the image data read by the reading section coincides with the image data stored in the storage section in advance, or store the image data read by the reading section in the storage section if it is determined that the image data does not coincide with each other; and
a color erasing section configured to erase the color of the image formed on the sheet, wherein
the mark is a mark representing the storage of the data of the image formed on the sheet through the processing of an image forming apparatus
the mark is an image formed on the sheet by the image forming apparatus as the code containing the file name of the image data; and
the control section extracts the machine-readable code in the image data acquired by the reading section, acquires the image data stored by the image forming apparatus based on a file name contained in the code, and carries out the aforementioned comparison.

7. An image storage method for a color erasing apparatus, comprising:
reading an image formed on a sheet to acquire image data;
storing the acquired image data in a storage section; and
determining whether or not there exists a mark in the image data, and carrying out a control to, in a case in which there exists a mark in the image data, delete the image data read by the reading section from the storage section if it is determined that there exists a mark and the image data acquired by the reading section coincides with the image data stored through the processing of an image forming apparatus when determining whether or not the image data read by the reading section coincides with the image data stored in the storage section in advance, or store the image data read by the reading section in the storage section if it is determined that the image data does not coincide with each other, wherein
the mark is a mark representing the storage of the data of the image formed on the sheet through the processing of an image forming apparatus
the mark is an image formed on the sheet by the image forming apparatus as the code containing the file name of the image data; and
extracting the machine-readable code in the image data acquired by the reading section, acquires the image data stored by the image forming apparatus based on a file name contained in the code, and carries out the aforementioned comparison.

8. The image storage method according to claim 7, wherein the mark is a mark representing the storage of the data of the image formed on the sheet through the processing of an image forming apparatus.

* * * * *